United States Patent [19]

Hershey

[11] 4,191,386
[45] Mar. 4, 1980

[54] SELF-COOLED MECHANICAL SEAL

[75] Inventor: Lowell E. Hershey, Portage, Mich.

[73] Assignee: Durametallic Corporation, Kalamazoo, Mich.

[21] Appl. No.: 870,006

[22] Filed: Jan. 16, 1978

[51] Int. Cl.² .............................................. F16J 15/34
[52] U.S. Cl. ...................................... 277/22; 277/64; 277/65
[58] Field of Search ....................... 277/92, 81, 22, 64, 277/65, 125

[56] References Cited

U.S. PATENT DOCUMENTS

| | | | |
|---|---|---|---|
| 2,818,284 | 12/1957 | Stevens | 277/92 |
| 3,327,681 | 6/1967 | Hortuet | 277/124 |
| 3,895,811 | 7/1975 | Richard et al. | 277/22 |

*Primary Examiner*—Robert I. Smith
*Attorney, Agent, or Firm*—Blanchard, Flynn, Thiel, Boutell & Tanis

[57] ABSTRACT

A conventional outside seal assembly is disposed outside the stuffing box which surrounds a rotatable shaft. A thermally conductive packing structure is disposed within the stuffing box in concentric and surrounding relationship to the shaft. The packing structure facilitates the transfer of heat from the shaft and the fluid radially outwardly to the stuffing box, and then to the surrounding atmosphere. The packing structure has thermal insulators associated therewith for preventing heat from being transmitted axially toward the seal assembly, thereby permitting the seal assembly to operate at a lower temperature. This packing structure, in a preferred embodiment, utilizes a plurality of annular packing rings constructed of a thermally conductive material, which packing rings are axially aligned and are spaced apart by intermediate washerlike insulators. The seal assembly preferably has a bladed fan secured to the rotatable part thereof for increasing the air flow across the seal faces and the stuffing box.

8 Claims, 2 Drawing Figures

SELF-COOLED MECHANICAL SEAL

FIELD OF THE INVENTION

This invention relates to a mechanical seal assembly of the "outside" type and, in particular, to an improved seal assembly which incorporates a thermally conductive packing structure to facilitate the transfer of heat away from the seal assembly so that the latter can be substantially self-cooling.

BACKGROUND OF THE INVENTION

While the apparatus of this invention is applicable to a wide range of devices wherein a rotatable shaft extends through a wall, said wall usually being a portion of a closed vessel in which a fluid pressure is created, it is particularly applicable to such devices as pumps, autoclaves, turbines and the like. Accordingly, for purposes of discussion, reference will be made hereinafter to the use of such invention with pumps. Such reference will, however, be understood as being illustrative only and imparting no limitation on the use or applicability of the invention.

Mechanical seals for rotating shafts, such as in or adjacent the stuffing box of a centrifugal pump, normally are grouped into two well-known classes which are commonly termed "inside seals" and "outside seals" depending on whether the sealing faces are inside or outside the stuffing box. Typical "inside" seals are illustrated in U.S. Pat. Nos. 3,765,689, 3,697,088 and 3,665,206; while typical "outside" seals are illustrated in U.S. Pat. Nos. 3,155,393 and 3,198,530.

In devices which handle fluids generally considered dangerous, such as due to the high temperature, high pressure and/or corrosive properties of the fluid, inside seals have been substantially unanimously utilized since, for reasons well understood by those skilled in this art, such seals are considered more satisfactory from such standpoints as lubrication, capacity to withstand high pressures, capability of controlling seal temperature while handling high temperature fluids, and ability to prevent sudden and uncontrolled discharge of a dangerous fluid in the event of seal failure. Inside seals, however, do have a problem when handling high temperature fluids, such as heat transfer fluids above 300° F., which fluids can oxidize and harden upon contact with air. The hardened product leakage accumulates between the shaft and rotary seal part, soon causing immobilization (or more commonly called "hang-up") of the axial movement necessary to allow for wear, and the seal fails by leakage. Normal outside seals have not been considered adaptable to providing compliance or improvement on the above features.

More specifically, particularly when dealing with fluids of high temperature, such as temperatures in excess of approximately 300° F., cooling of the seal becomes a significant problem since the heat of the fluid within the pumping chamber is transmitted to the seal faces, both through the fluid and through the shaft. The overall seal thus becomes relatively hot and this results in damage to the seal assembly, and specifically the packings and gaskets, and the formation of a hard coke-like deposit from normal minute leakage which tends to build up and immobilize the movable sealing element which in turn creates more leakage, soon causing the seal to fail. To control the temperature, inside seals are particularly suitable since the seal faces are located within the stuffing box and a cooling chamber is generally provided in surrounding relationship to the seal, which cooling chamber has a separate liquid coolant circulating therethrough for controlling seal temperature, often by flushing over the rubbing faces through the gland. Seals of the outside type, on the other hand, due to their being positioned outside the stuffing box, are thus not readily adaptable for use with a separate liquid coolant for permitting the seal temperature to be controlled.

Outside seals are more desirable for minimizing the effects of coke-like deposits on the atmospheric side of the seal faces because the deposit is flung outward by centrifugal force, whereas with an inside seal, the centrifugal force tends to trap the leaked product which hardens and causes immobilization or hang-up of the movable element; hence the need to cool the product is more urgent with the inside seal.

In addition, outside seals normally require the use of an elastomeric O-ring at the outer end of the seal for creating a sealed relationship between the rotatable seal ring and the shaft. When fluid temperatures exceed 300° F., conventional elastomeric O-rings deteriorate at a rather rapid rate and thus ultimately result in leakage, which not only creates a potentially dangerous condition, but also requires undesirable shutdown of the equipment and repair of the seal. For this reason, in conjunction with the other disadvantages explained above, seals of the outside type have thus normally been usable only with relatively low temperature fluids. For example, in the refinery industry wherein the fluids being handled normally are at relatively high temperatures, the pumping equipment almost exclusively utilizes inside seals in view of the recognized disadvantages and problems experienced with outside seals.

Thus, while the applicability of outside seals has heretofore been extremely limited, nevertheless such outside seals are well recognized as possessing advantageous features in contrast to inside seals. For example, the outside seal is advantageous from the standpoint of visual inspection, access, maintenance and repair, and is much less prone to hang-up problems created by coking-type fluids such as heat transfer fluids and hydrocarbons. However, in view of the shortcomings mentioned above, outside seals have had only limited applicability.

Accordingly, it is an object of this invention to provide an improved outside seal construction which overcomes many of the above-mentioned shortcomings and, in particular, is highly desirable for use with high temperature fluids, that is fluids having a temperature in excess of approximately 300° F. More specifically, the objects of the present invention are the provision of:

1. An improved outside seal construction, as aforesaid, which can be safely and satisfactorily used with high temperature fluids while at the same time being substantially self-cooling, so as to not require the use of complex external cooling systems.

2. An outside seal construction, as aforesaid, which employs a thermally conductive packing disposed in surrounding relationship to the shaft and located axially between the seal faces and the pumping chamber, which packing is of high radial thermal conductivity but creates a thermally insulated barrier in the axial direction thereof, whereby heat is readily transmitted radially from the shaft and fluid through the packing into the stuffing box and thence into the environment.

3. An outside seal construction, as aforesaid, wherein the packing preferably employs a plurality of packing rings disposed in axially aligned relationship along the shaft, with thermally insulative washers being disposed between axially adjacent packing rings, whereby the shaft and fluid heat is readily transmitted radially outwardly of the stuffing box.

4. An outside seal construction, as aforesaid, which is also desirable for use with high pressure fluids while providing for safe confinement of the fluid in the event of seal failure.

5. An outside seal construction, as aforesaid, wherein the packing is axially elongated and closely surrounds the shaft to define an axially elongated annular clearance space of narrow radial width therebetween, whereby the packing functions as a restrictive bushing and hence prevents the rapid escape of large quantities of fluid therepast in the event of a seal failure.

6. An outside seal construction, as aforesaid, which permits a rotatable fan structure to be incorporated therewith to facilitate and assist in directing the flow of air across the exterior of the seal and stuffing box to facilitate self-cooling of the seal.

7. An outside seal construction, as aforesaid, which utilizes a pair of opposed relatively rotatable face rings for defining a sealed engagement therebetween, which face rings are of substantially the same exterior diameter so that any fluid which tends to escape by flowing radially outwardly between the seal faces is thus more easily discharged from the seal, such as by being thrown off due to centrifugal force, whereby the fluid does not harden directly adjacent the outer edges of the seal faces and thereby cause hang up of the seal.

8. An outside seal construction, as aforesaid, which possesses all of the conventional advantages normally possessed by an outside seal, while at the same time also possessing many of the operational advantages previously possessed only by an inside seal.

Other objects and purposes of the invention will be apparent to persons familiar with seals of this type upon reading the following specification and inspecting the accompanying drawings.

Figures 1, 2:
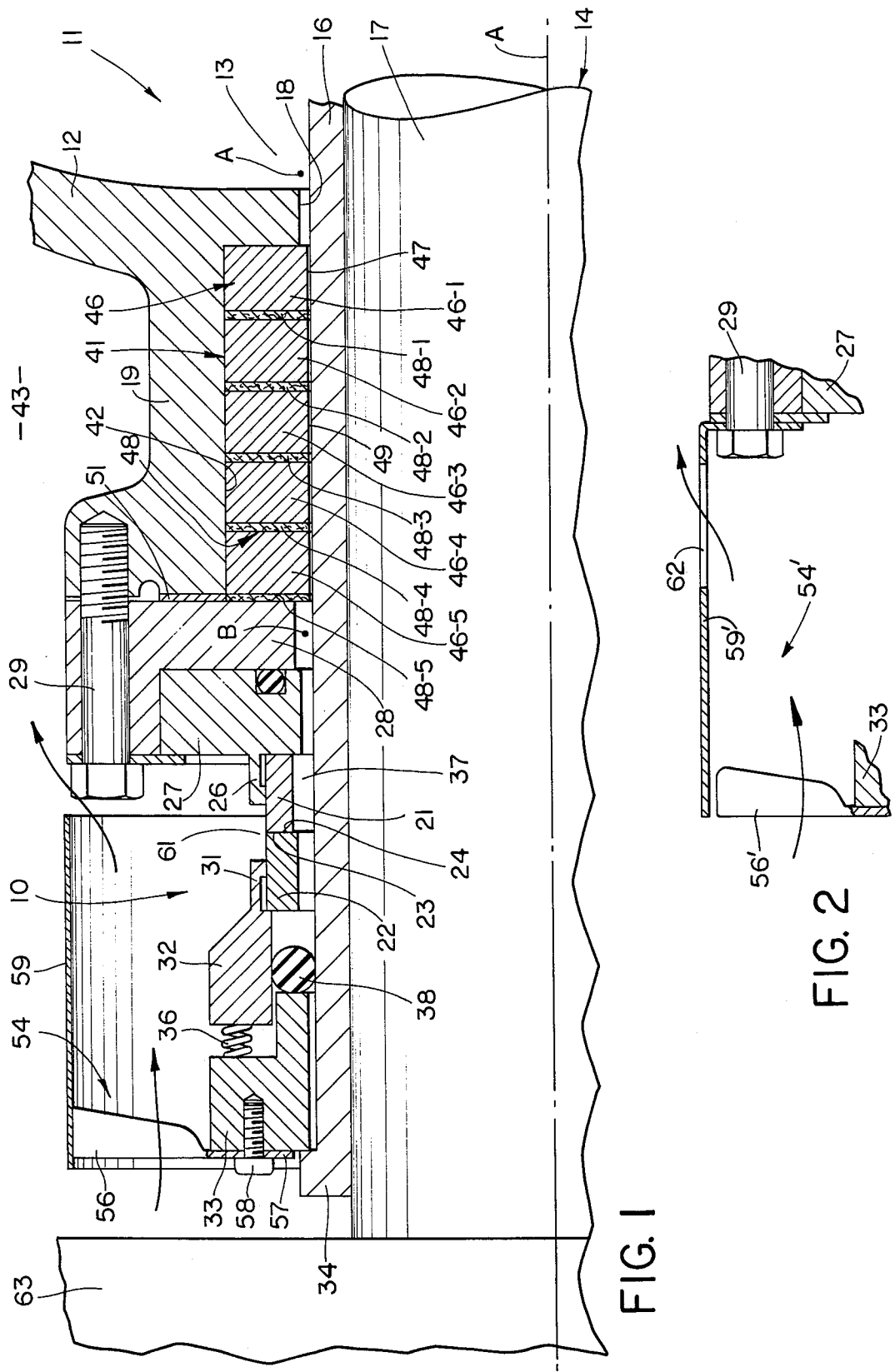
FIG. 1 is a fragmentary central sectional view of an outside mechanical seal construction embodying the present invention.
FIG. 2 illustrates a modification.

Certain terminology will be used in the following description for convenience in reference only and will not be limiting. The words "upwardly," "downwardly," "leftwardly" and "rightwardly" will designate directions in the drawings to which reference is made. The words "inwardly" and "outwardly" will refer to directions toward and away from, respectively, the geometric center of the device and designated parts thereof. Said terminology will include the words specifically mentioned, derivatives thereof, and words of similar import.

SUMMARY OF THE INVENTION

The objects and purposes of this invention, including those mentioned above, have been met by providing an outside seal assembly positioned for creating a sealed relationship between a rotatable shaft and a stuffing box associated with a fluid handling apparatus, such as a centrifugal pump. The seal assembly includes a pair of opposed seal rings, one nonrotatably connected to the shaft and the other nonrotatably secured to the stuffing box, which rings have opposite axial faces urged into relatively rotatable sealing engagement with one another. A packing is disposed within the stuffing box in surrounding relationship to the shaft, which packing is disposed axially between the seal rings and the pumping chamber. This packing is of a thermally conductive material to facilitate the transfer of heat radially outwardly from the fluid and the shaft through the packing and into the stuffing box, and thence into the surrounding environment. Appropriate insulators are associated with the packing and disposed axially between the packing and the seal rings to prevent or minimize heat transfer to the seal rings. The packing preferably includes a plurality of axially aligned packing rings of thermally conductive material, and a plurality of thermally insulative washers are interposed between axially adjacent packing rings. This packing defines a narrow annular clearance space in surrounding relationship to the shaft so that it restricts the fluid flow therepast.

DETAILED DESCRIPTION

Referring to FIG. 1, there is illustrated a mechanical seal assembly 10 of the "outside" type disposed in association with a fluid handling apparatus 11, for example a centrifugal pump, having a housing, one wall 12 being illustrated, which defines therein a fluid chamber 13. A shaft 14, rotatable about the axis A, projects outwardly from the housing through a wall opening 18. The shaft 14, which in the illustrated embodiment is formed by an internal shaft member 17 having a sleeve 16 nonrotatably mounted thereon, has a conventional rotor or pump impeller (not shown) nonrotatably mounted on the rightward end thereof.

The wall 12 has a stuffing box 19 associated therewith and disposed in coaxial alignment with the opening 18. The stuffing box 19 is of a sleevelike construction and is fixedly, here integrally, related to the wall 12. The shaft 14 projects outwardly through the stuffing box 19, and the mechanical seal assembly 10 is disposed for creating a sealed relationship between the shaft 14 and the stuffing box 19 to prevent escape of fluid from the chamber 13.

The seal assembly 10 includes a pair of axially opposed face rings 21 and 22 which respectively have annular axially opposed seal faces 23 and 24 thereon, which seal faces are disposed in abutting engagement with one another so as to provide a relatively rotatable sliding sealed relationship therebetween. The face rings are normally of tungsten carbide material.

The face ring 21 is nonrotatably positioned, as by means of a press fit, within an annular flange 26 which is integral with and projects axially from one side of an annular insert 27, which insert in turn is fixedly connected to an annular gland 28. This gland is fixedly connected to the outer end of stuffing box 19, as by threaded fasteners such as screws 29. This mounting structure thus holds the face ring 21 in a stationary condition wherein same concentrically surrounds the shaft 14.

The other face ring 22 is similarly mounted within an annular flange 31, as by being press fit therein, which is integral with and projects axially of a seal ring 32, the latter being substantially concentric with the shaft 14. An annular collar 33 is disposed axially outwardly of the seal ring 32 and is nonrotatably connected to the shaft 14, as by being keyed thereto. This collar 33 is axially retained on the shaft, as by abutting against a shoulder 34. The collar 33 and seal ring 32 are nonrotatably interconnected in a conventional manner, as by pins fixed to collar 33 and projecting axially into openings formed in the seal ring 32 to permit axial displacement of the seal ring. Conventional compression springs 36 are disposed between the sealing 32 and collar 33 for resiliently urging the seal ring 32 and its face ring 22 into engagement with the stationary face ring 21.

The mechanical seal assembly as above described results in the formation of an annular compartment 37 which is defined within the seal components in surrounding relationship to the shaft 14. The axially outer end of this compartment 37 is in turn sealingly closed by a conventional elastomeric seal ring 38, such as an O-ring, which ring is maintained in sealing engagement with the shaft 14, seal ring 32 and collar 33.

The seal assembly 10 as described above, is of conventional construction, and both the structure and operation thereof is well understood by those familiar with seals of this type.

According to the present invention, there is provided a heat dissipating packing structure 41 positioned axially between the fluid chamber 13 and the seal assembly 10. This packing structure 41 is disposed within the stuffing box 19 in surrounding relationship to the shaft 14 so as to not only greatly restrict the quantity of fluid which is permitted to flow along the shaft into the compartment 37, but also greatly facilitate the transfer of heat from the fluid and the shaft into the surrounding environment 43 prior to this heat reaching the seal assembly 10. The packing structure 41 is of an axially elongated annular structure and is fixedly disposed within an annular cylindrical recess 42 defined within the stuffing box 19.

In the illustrated embodiment, the packing structure includes a plurality of packing rings 46 which are disposed in axially aligned relationship along the shaft, there being five such rings in the illustrated embodiment and designated 46-1 through 46-5 for purposes of identification. The packing rings 46 have their outer peripheral surface snugly seated within the stuffing box 19, whereas the inner peripheral surface of the packing rings is of a diameter slightly larger than the shaft 14, thereby leaving an annular clearance passage 49 of very small radial width therebetween. The packing rings 46 are of a material which possesses a relatively high coefficient of thermal conductivity, at least in the radial direction. This property is desirably achieved by utilizing a conventional metal packing ring, such as of compressed metal foil.

The packing structure 41 also includes a plurality of heat insulator rings 48 disposed axially between adjacent packing rings 46, these rings being identified as 48-1 through 48-4 for purposes of identification, with a further such ring 48-5 being disposed axially between the endmost packing ring 46-5 and the gland 28. These insulator rings 48 are formed as thin washerlike members having outer and inner diameters substantially corresponding to those of the packing rings 46. These insulator rings 48 are constructed of a material having a low coefficient of thermal conductivity, at least in the axial direction, and thus function as heat insulators for effectively preventing or greatly minimizing the transfer of heat axially between adjacent packing rings. Teflon is one of several suitable materials for the insulator rings 48.

There is also provided a further insulator ring 51 disposed between the adjacent ends of the stuffing box 19 and the gland 28 to prevent or greatly minimize transfer of heat from the stuffing box to the gland. This ring 51 may be a separate ring as shown, or may be an integral part of the ring 48-5.

To further improve the cooling of the seal, same is preferably provided with a cooling fan structure 54. This structure includes a bladed fan wheel 56 which concentrically surrounds the collar 33 and has a central hub 57 which is fixed to the collar, as by threaded fasteners 58. An axially elongated annular shroud 59 is disposed in concentric relationship to the seal assembly and to the fan wheel so as to channel the airstream from the fan wheel axially over the outer surfaces of the seal components. This shroud 59, in the illustrated embodiment, has the outer or leftward end thereof fixed to the outer edge of the fan wheel 56 so that the shroud thus rotates therewith. The shroud 59 projects axially toward the stuffing box and terminates just short of the stuffing box so that the airstream can escape from within the shroud and then flow along the outer surface of the stuffing box.

In the preferred embodiment of the seal 10, the face rings 21 and 22 are preferably provided with substantially equal outside diameters, as illustrated in FIG. 2, so that there is thus provided an open or free region 61, directly adjacent the radially outer edges of the seal faces.

The shroud 59 surrounds the region 61 adjacent the outer edges of the seal faces so as to confine any fluid which might escape past the seal faces.

Referring to FIG. 2, there is illustrated a modified fan structure 54' which is substantially identical to the fan structure 54 of FIG. 1 except that shroud 59' is nonrotatably connected to the stuffing box 19 and projects axially therefrom so as to protectively surround the fan wheel 56'. The shroud 59' has openings 62 formed through the sidewall thereof adjacent the stuffing box to permit flow of air through the shroud and then outwardly therefrom and thence along the outer periphery of the stuffing box.

OPERATION

The operation of the seal construction according to the present invention will be briefly described to insure a complete understanding thereof.

The fluid within pumping chamber 13 can, in limited quantities, flow axially along shaft 14 and through the narrow annular passage 49 and thence into the compartment 37. The pressurized fluid within compartment 37 acts against the O-ring 38 and deforms same so that it sealingly engages the collar 33, seal ring 32 and shaft 14, all of which rotate as a unit. The fluid within compartment 37 is additionally prevented from escaping by the slidable sealed engagement between the relatively rotatable seal faces 23 and 24. Any fluid which tends to leak between the faces 23 and 24, however, flows radially outwardly such that the fluid, when reaching the region 61, may be discharged radially from the seal rings due to centrifugal force. While some of this fluid may tend to collect and solidify on the outer periphery of the stationary face ring 21, particularly since the fluid tends to cool and hence oxidize, nevertheless this does not disrupt the proper operation of the seal since any buildup of material on the outer periphery of the stationary face ring 21 occurs in a direction away from the seal face due to the openness of the region 61.

To maintain the seal assembly 10 cool, and particularly the face rings 21–22, a substantial quantity of the fluid and shaft heat must be dissipated to the atmosphere 43 through the packing structure 41. Since the packing rings 46 are separated from the shaft 14 by only a narrow annular clearance 49, the heat of the fluid and the heat transferred axially through the shaft 14 is thus readily transferred into the packing rings 46. Due to the high thermal conductivity of these packing rings, this heat is then readily transferred to the stuffing box 19, and thence into the surrounding environment 43. This radial transfer of heat outwardly through the stuffing box is greatly facilitated by the axial length of the packing structure 41, which thereby provides a substantially large surface area in surrounding relationship to the shaft.

To insure that the heat which is transferred to the packing rings is not transmitted axially therealong into the vicinity of the seal assembly, there is provided the thermal insulators 48 which effectively act as heat transfer barriers in the axial direction of the packing structure. The heat transferred into the packing rings is thus prevented from flowing axially, and hence must be transferred radially into the stuffing box. Since an insulator 51 is also present between the stuffing box 19 and the gland 28, this also prevents the heat from being transmitted axially toward the seal, so as to insure that the heat of the stuffing box is thus transmitted substantially solely radially and is hence transferred to the surrounding air.

The cooling is further assisted by the fan structure 54 which directs an airstream axially along the outer periphery of the seal and then along the outer periphery of the stuffing box, thereby increasing the efficiency of the heat transfer through the packing 41 and stuffing box 19 into the air 43.

In the event that the seal 10 should experience a failure, such as due to deterioration of the O-ring 38, then the sudden leakage of large quantities of fluid is effectively prevented by the packing structure 41 and its close surrounding relationship to the shaft 14. This packing structure 41, due both to the great axial length and narrow radial width of the clearance passage 49, effectively acts as a flow restrictive bushing to thereby severely limit the discharge of fluid from the pumping chamber and hence prevent a disastrous or dangerous seal failure.

Thus, when utilizing the seal construction of the present invention, the outside seal assembly 10 can be utilized with an apparatus 11 handling a fluid of substantially higher temperature than was previously possible. For example, this seal construction can be successfully utilized with fluids having temperatures in the order of 500° to 600° F., which temperatures would previously have prohibited long-term use of an outside seal. As the high temperature fluid escapes from the chamber 13 and flows axially through the passage 49, and as the heat of the fluid is transmitted axially (leftwardly) along the shaft 14, a substantial amount of this heat is transmitted radially into the packing structure 41 which, due to the presence of the thermal barriers which prevent axial heat transmission, is thus forced to transmit this heat radially into the stuffing box and thence into the environment 43. A substantial quantity of the heat is thus discharged into the environment and hence is prevented from being transmitted to the seal assembly 10. Thus, the fluid which reaches the seal compartment 37 and the portion of the shaft 14 disposed in the direct vicinity of the seal assembly 10 is thus at a much lower temperature, such as in the order of 300° to 400° F. for example, so that the outside seal assembly can be successfully operated for long periods of time without undergoing deterioration due to operation at excessive temperatures. This packing structure also greatly minimizes the heat transfer axially of the shaft so that the shaft bearings 63 can thus be maintained at a substantially lower temperature.

To illustrate the beneficial effects which result from the use of the highly conductive thermal packing 41 and the fan 54 in association with an outside seal, reference will be made to data taken from experimental comparative tests carried out on an outside seal assembly of the type illustrated in FIG. 1. During these tests, the temperature of the fluid or product was measured at point A within the pumping chamber and at point B adjacent the gland. Under all of the tests, the product temperature at point A was 550° F. In a first test, the seal assembly was not provided with either the packing 41 or the fan 54, and the product temperature at point B was 528° F., there thus being a temperature drop between points A and B of only 22°. In a second test, the seal assembly was provided solely with the thermally conductive packing 41, and the temperature at point B was 443° F., there thus being a temperature drop of 107° between points A and B. In a third test, the outside seal assembly was provided with both the thermally conductive packing 41 and the fan 54, and the results of this test indicate a product temperature at point B of 387° F., the temperature drop between points A and B thus being 163°.

These tests clearly indicate that the temperature drop between the product and the gland can be greatly increased when utilizing the present invention. Further, the seal faces 23-24 and the O-ring packing 38 are positioned still further from the heat source, and hence the temperature of the product adjacent these elements will be considerably cooler than the temperature adjacent the gland (point B). Since conventional inexpensive fluoroelastomer O-rings can withstand temperatures up to 400° F. for long periods of time without serious deterioration, whereas such fluoroelastomer O-rings rapidly deteriorate when exposed to temperatures of 450° F. or higher, the present invention thus permits the use of an outside seal employing a conventional fluoroelastomer O-ring while handling high-temperature fluids.

The above test values illustrate the effectiveness of the present invention in a typical, although not necessarily optimum, arrangement. It will be appreciated, however, that such values are solely for purposes of comparison since the values can vary greatly depending upon the structural and physical design of the overall outside seal and specifically the size and characteristics of the thermally conductive packing 41, the size and rotational speed of the fan 54, and the nature of the fluid or product.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a seal construction for creating a sealed relationship between a wall of a fluid handling device for use with a high-temperature fluid and a rotatable shaft projecting outwardly of the wall through an opening formed therein, the fluid handling device defining therein a fluid chamber in communication with the opening, said wall having an axially elongated sleevelike stuffing box fixedly related thereto in concentric and surrounding relationship to said shaft so that the interior of said stuffing box communicates with said opening, and a mechanical seal assembly positioned adjacent the free end of the stuffing box and disposed in surrounding relationship to the shaft for creating a sealed relationship therebetween to prevent escape of fluid from said device, said mechanical seal assembly including first and second seal ring means disposed in axially opposed relationship, first mounting means for nonrotatably connecting said first seal ring means with respect to said stuffing box, second mounting means for nonrotatably connecting said second seal ring means with respect to said shaft, said first and second seal ring means respectively having first and second annular axially directed seal faces formed thereon and disposed in relatively rotatable sliding sealing engagement with one another, the improvement comprising heat dissipating packing means disposed within the stuffing box axially between said opening and said mechanical seal assembly for (1) extracting substantial quantities of heat from the fluid and the shaft and transferring same radially outwardly into the stuffing box and thence into the surrounding environment and (2) restricting the flow of fluid therepast from said device to said mechanical seal assembly, said heat dissipating packing means being formed as an axially elongated sleevelike packing structure stationarily mounted within the interior of said stuffing box in close surrounding relationship to said shaft so as to define a narrow annular clearance space in surrounding relationship to said shaft, said sleevelike packing structure having a relatively high heat transfer coefficient in the radial direction to facilitate the transfer of heat radially outwardly into the stuffing box while having a low heat transfer coefficient in the axial direction to prevent heat transfer axially therealong toward the mechanical seal assembly, said packing structure including a plurality of axially aligned packing rings positioned within said stuffing box in surrounding relationship to said shaft and a plurality of thermal insulator rings disposed in axial alignment with said packing rings, said packing rings being constructed of a material having a high heat transfer coefficient, and said insulator rings being axially spaced apart and positioned axially between adjacent packing rings for preventing heat transfer axially between adjacent packing rings.

2. A construction according to claim 1, wherein said packing rings are constructed of metal, and wherein said insulator rings comprise thin washers constructed of a nonmetallic material.

3. A construction according to claim 1, including rotatable fan means associated with said mechanical seal assembly for causing an airstream to flow substantially axially along the outer surface of said mechanical seal assembly and then along the outer surface of said stuffing box for assisting in removing heat therefrom.

4. A construction according to claim 3, wherein said fan means includes a bladed fan wheel disposed in surrounding relationship to said shaft and fixedly connected with respect to said second mounting means for rotation therewith, said fan wheel causing an airstream to be moved axially along the outer periphery of said seal and thence along the outer periphery of said stuffing box, and an annular protective shroud disposed in surrounding relationship to said fan wheel and projecting axially toward said stuffing box for channeling the airstream along the mechanical seal assembly toward the stuffing box.

5. A structure according to claim 1, wherein said packing rings are constructed of metal, and wherein said insulator rings are of a nonmetal.

6. A packing structure according to claim 1, wherein said packing and insulator rings have substantially coextensive axial faces disposed in engagement with one another, and said packing rings having an axial thickness which is several times greater than the axial thickness of said insulator rings.

7. In a mechanical seal construction for use between a wall and a rotatable shaft extending therethrough, said wall including an annular stuffing box fixedly related thereto and projecting axially therefrom in surrounding relationship to said shaft, wherein said mechanical seal construction has a pair of annular sealing members disposed in surrounding relationship to said shaft and having mutually contacting sealing faces disposed in relatively rotatable sliding sealed engagement with one another, said sealing faces being spaced outwardly from said stuffing box, annular gland means fixed to said stuffing box adjacent the free end thereof for fixing a first said annular sealing member with respect to said wall, and annular collar means for nonrotatably connecting a second said annular sealing member with respect to said shaft, the improvement comprising:
fan means for causing a stream of air to flow axially along the outer periphery of said seal construction toward said stuffing box, said fan means including an annular bladed fan wheel nonrotatably connected to said collar means for rotation therewith, and an axially elongated sleevelike shroud disposed in surrounding relationship to said fan wheel and projecting axially therefrom toward said stuffing box for directing the airstream axially along the outside of the sealing members and thence along the outside of said stuffing box;
axially elongated annular packing means stationarily positioned within said stuffing box in surrounding relationship to said shaft, said packing means having a high heat transfer coefficient at least in the radial direction thereof for effecting heat transfer from the shaft and fluid radially through the packing means into the surrounding stuffing box for transfer into the surrounding environment, and thermal insulator means interposed axially between said packing means and said gland means for minimizing heat transfer axially of said packing means toward said seal faces.

8. A construction according to claim 7, wherein said packing means includes a plurality of coaxially aligned packing rings disposed in surrounding relationship to said shaft, and said thermal insulator means including a plurality of thermally insulative rings disposed in surrounding relationship to said shaft and interposed axially between adjacent packing rings, one of said thermally insulative rings being interposed axially between said gland means and the axially closest packing ring.

* * * * *